(12) United States Patent
Li et al.

(10) Patent No.: US 11,506,859 B2
(45) Date of Patent: Nov. 22, 2022

(54) LENS MODULE

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN); Chunxin Gu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 288 days.

(21) Appl. No.: 16/885,199

(22) Filed: May 27, 2020

(65) Prior Publication Data

US 2021/0109309 A1  Apr. 15, 2021

(30) Foreign Application Priority Data

Oct. 15, 2019 (CN) .......................... 201910980597.3

(51) Int. Cl.
| | |
|---|---|
| *H04N 5/225* | (2006.01) |
| *G02B 7/02* | (2021.01) |
| *G02B 7/10* | (2021.01) |
| *G02B 27/64* | (2006.01) |
| *H04N 5/232* | (2006.01) |

(52) U.S. Cl.
CPC ............ *G02B 7/027* (2013.01); *G02B 7/102* (2013.01); *G02B 27/646* (2013.01); *H04N 5/2252* (2013.01); *H04N 5/23248* (2013.01)

(58) Field of Classification Search
CPC ...... G02B 7/027; G02B 7/102; G02B 27/646; G02B 7/02; G02B 7/08; G02B 7/09; H04N 5/2252; H04N 5/23248; H04N 5/2254
See application file for complete search history.

(56) References Cited

U.S. PATENT DOCUMENTS 10,845,565 B2 * 11/2020 Bachar ................ H04N 5/2254
2019/0162934 A1 * 5/2019 Dong .................... G02B 7/102

\* cited by examiner

*Primary Examiner* — Mekonnen D Dagnew
(74) *Attorney, Agent, or Firm* — W&G Law Group

(57) ABSTRACT

The invention provides a lens module having a housing, and a focusing support frame, a first base, a second base, and a lens. The focusing support frame is provided with three first guide slots, and the first base is provided with three second guide slots. A first ball is provided between the first guide slot and the second guide slot. The first base is provided with three third guide slots, the second base is provided with three fourth guide slots, and a second ball is provided between the third guide slot and the fourth guide slot. Through stacked focusing support frame and relative movement between the first base and the second base, auto focus and optical image stabilization can be realized. The stable lens movement can be realized through the least number of guide mechanisms and the simplest structure.

9 Claims, 7 Drawing Sheets

LENS MODULE

FIELD OF THE PRESENT DISCLOSURE

The present invention relates to the field of optical imaging technology, and in particular to a lens module.

DESCRIPTION OF RELATED ART

In recent years, with the development of optical imaging technology and the rise of electronic products with imaging functions, optical lenses have been widely used in various electronic products. Generally, the light is irradiated directly from the object side, reaches the image side by penetrating the lens component in a straight line along the optical axis. The lens component is used to capture an image of the object. The lens component generally has an auto focus function (auto focusing) and an optical image stabilization (OIS) function.

The movement stability of the lens of the lens module in the prior art is not high in the process of auto focus and optical image stabilization, besides the mechanical structure is complicated. Therefore, it is necessary to provide a new lens module to solve the above problems.

SUMMARY OF THE PRESENT DISCLOSURE

One of the primary objectives of the present invention is to provide a lens module enabling stable movement of the lens units for performing auto focusing and optical image stabilization functions.

To achieve the object mentioned above, the present invention provides a lens module including:

a housing;

a focusing support frame provided with three first guide slots on a bottom side thereof;

a first base below the focusing support frame, being provided with three second guide slots on a top side thereof, corresponding to the first guide slots;

a second base below the first base;

a lens accommodated in the housing and coupled to the focusing support frame;

a first ball provided between the first guide slot and the second guide slot;

a first guide mechanism formed by the first guide slot, the corresponding second guide slot and the first ball;

three third guide slots provided on a bottom side of the first base;

three fourth guide slots provided on a top side of the second base corresponding to the third guide slots;

a second ball provided between the third guide slot and the fourth guide slot;

a second guide mechanism formed by the third guide slot, the fourth guide slot, and the second ball; wherein the focusing support frame is moveable along an optical axis direction of the lens relative to the first base and the second base; and the focusing support frame and the first base is moveable together relative to the second base along a direction perpendicular to the optical axis direction.

As an improvement, a first elastic piece is connected between the focusing support frame and the first base, the first elastic piece generates elastic deformation only when the focusing support frame moves relative to the first base and the second base along the optical axis direction of the lens; a second elastic piece is connected between the first base and the second base, the second elastic piece generates elastic deformation only when the focusing support frame and the first base move together relative to the second base along a direction perpendicular to the lens optical axis.

As an improvement, the first guide slot and the second guide slot both extend along a direction parallel to the optical axis for guiding the first ball to move along a direction parallel to the optical axis; the third guide slot and the fourth guide slot both extend along a direction perpendicular to the optical axis of the lens for guiding the second ball to move along a direction perpendicular to the optical axis of the lens.

As an improvement, one of the first guide slots has a rectangular cross-section contour perpendicular to the optical axis direction of the lens or one of the second guide slots has a rectangular cross-section contour in a direction perpendicular to the optical axis of the lens; the rest cross-section contours of the first guide slot and the second guide slot are trapezoid or triangle along a direction perpendicular to the optical axis of the lens for restricting the first ball from moving along a direction perpendicular to the optical axis.

As an improvement, one of the third guide slots has a rectangular cross-section contour in a direction parallel to the optical axis of the lens or one of the fourth guide slots has a rectangular cross-section contour in a direction parallel to the optical axis of the lens; the rest cross-section contours of the third guide slot and the fourth guide slot are trapezoid or triangle along a direction parallel to the optical axis of the lens for restricting the second ball from moving along a direction parallel to the optical axis.

As an improvement, two first guide mechanisms are provided on one side of the optical axis of the lens, and the other one of the first guide mechanism is provided separately on the other side of the optical axis of the lens; the first guide mechanism separately provided is located between other two of the first guide mechanisms along a direction parallel to the optical axis; two of the second guide mechanism are provided on one side of the optical axis of the lens, the other one of the second guide mechanisms is separately provided on the other side of the optical axis of the lens, the second guide mechanism provided separately is located between other two of the second guide mechanisms along a direction parallel to the optical axis.

As an improvement, the lens module comprises a plurality of focusing magnets and corresponding focusing coils arranged in pairs for driving the focusing support frame to move relative to the first base and the second base along the optical axis direction of the lens;

and the lens module further comprises a plurality of anti-shake magnets and corresponding anti-shake coils arranged in pairs for driving the focusing support frame and the first base to move together relative to the second base along a direction perpendicular to the lens optical axis;

the focusing magnet is fixed to the bottom side of the focusing support frame, the housing comprises a top plate and a bottom plate, the bottom plate is a magnetic conductive piece and is attracted by the focusing magnet.

As an improvement, the focusing coil is provided on the bottom plate, and one of the anti-shake magnet and the anti-shake coil is fixed to the top side of the focusing support frame, and the other is provided on the top plate.

As an improvement, a quantity of the focusing magnets is three, and two of the focusing magnets are provided on both sides of separately arranged second guide slot of the first guide mechanism in the optical axis direction; the other one of the focusing magnet is arranged between two of the second guide slots of the first guide mechanism; a quantity of the anti-shake magnets is two, and two of the anti-shake magnets are respectively arranged on both sides of the optical axis of the lens.

As an improvement, the bottom side of the focusing support frame is provided with first accommodation slots, one of the focusing magnets is embedded in each of the first accommodation slots, and the second accommodation slots are provided on the top side of the focusing support frame, and one of the anti-shake magnets is embedded in each of the second accommodation slots.

As an improvement, the first elastic piece is arranged on side surface of the first base in a direction perpendicular to the optical axis of the lens, and the second elastic piece is arranged on side surface of the first base in a direction parallel to the optical axis of the lens.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

In the following, the present invention is further described with reference to the drawings and specific embodiments, it should be noted that, under the premise of no conflict, the embodiments or technical features described below can be arbitrarily combined to form a new embodiment.

Figure 1:
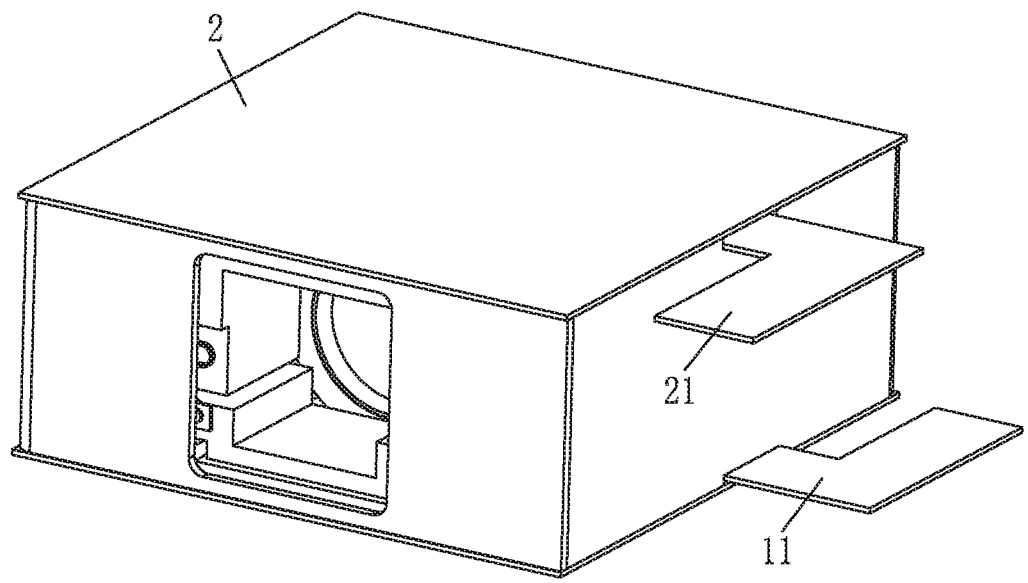
FIG. 1 is an isometric view of a lens module in accordance with an exemplary embodiment of the invention.
Figure 2:
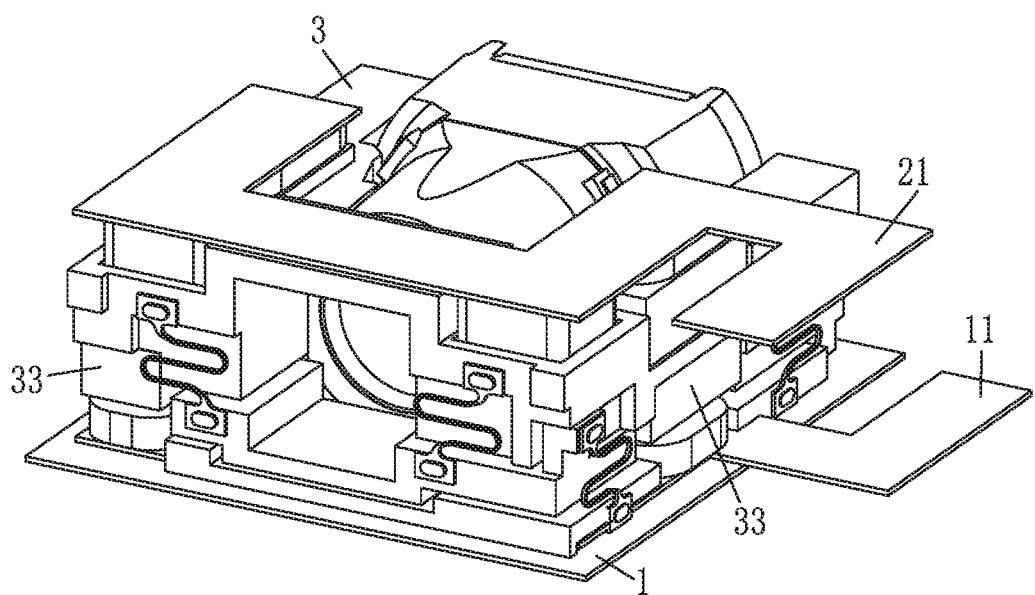
FIG. 2 is an inner view of the lens module of the invention.
Figure 3:
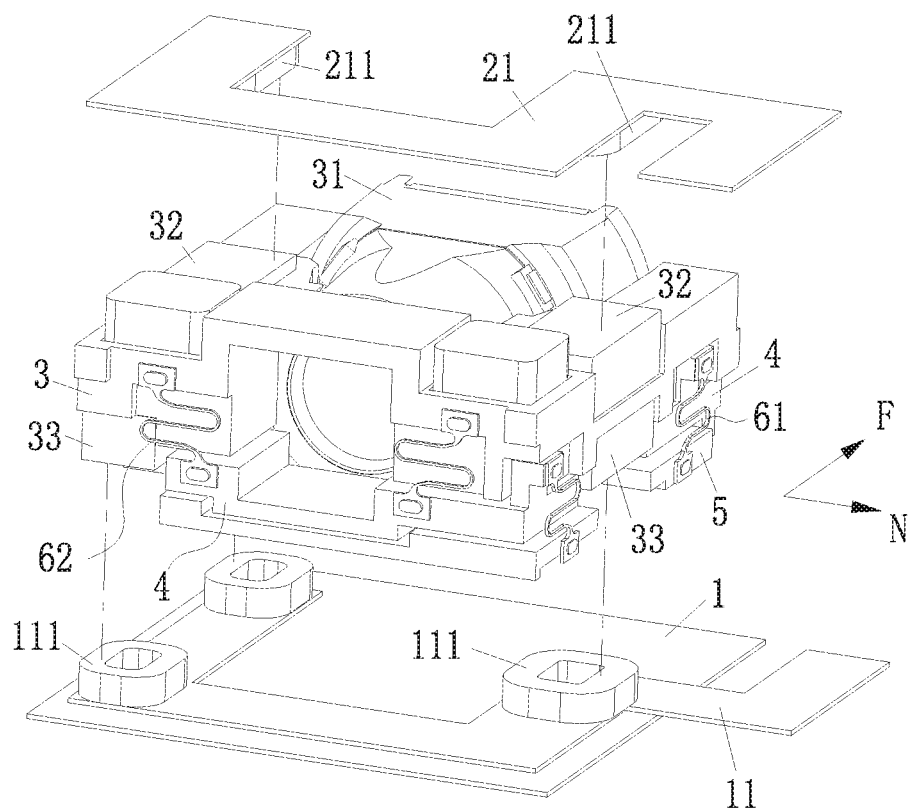
FIG. 3 is an inner exploded view of the lens module of the invention.

Referring now to FIGS. 1-3, a lens module comprises a housing, a focusing support frame 3, a first base 4, a second base 5, a lens 31, a focusing magnet 33, a focusing coil 111, and a first elastic piece 62. The housing comprises a top plate 2 and a bottom plate 1 spaced from the top plate 2. The focusing support frame 3, the first base 4 and the second base 5 are stacked on the bottom plate 1 in an order from top to bottom, and the lens 31 is installed on the focusing support frame 3. The focusing magnet 33 is installed on the focusing support frame 3, and the focusing coil 111 is installed on the bottom plate 1 and is used to cooperate with the focusing magnet 33 to drive the focusing support frame 3 to move relative to the first base 4 along an optical axis direction of lens 31 (the central axis line A in FIG. 7).

Figure 8:
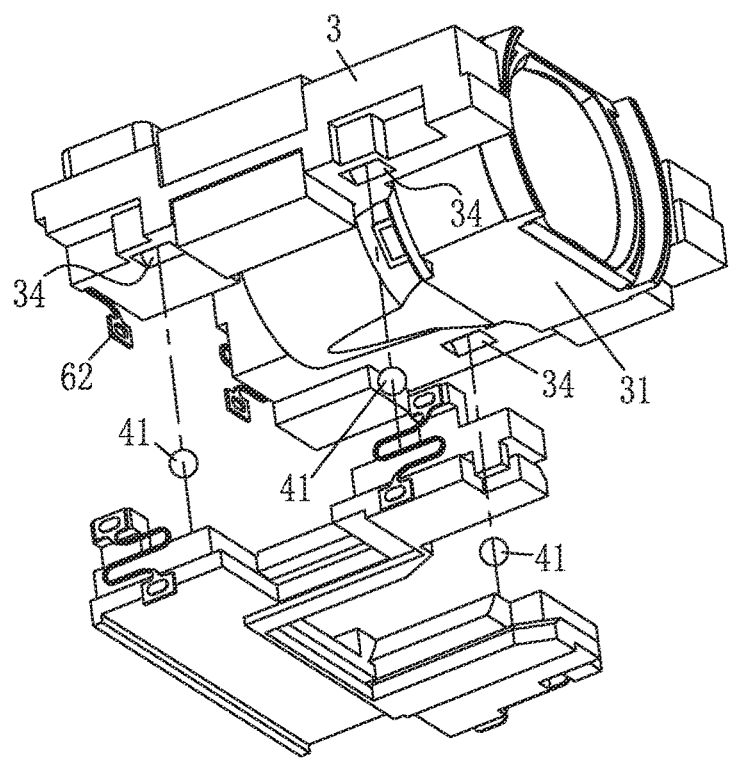
FIG. 8 is an inner partial exploded view of the lens module of the invention.

Referring now to FIG. 3 and FIG. 8, a pair of the first elastic pieces 62 are provided on the rear side of lens 31 (direction F in FIG. 3 is illustratively the front side), that is, arranged on rear side surface of the first base 4 in a direction perpendicular to the optical axis of the lens 31. One end of the first elastic piece 62 is connected to the focusing support frame 3 and the other end is connected to the first base 4 (referring to FIG. 4). The first elastic piece 62 generates elastic deformation only when the focusing support frame 3 moves relative to the first base 4 and the second base 5 along the optical axis direction of lens 31. When the lens 31 needs to focus, input current into the focusing coil 111, the focusing coil 111 generates changing magnetic field, the focusing magnet 33 moves under the influence of Lorentz magnetic force along the optical axis direction of the lens 31, the focusing completes, and then the first elastic piece 62 deforms and accumulates the elastic force. After the focusing has completed, disconnect the current flowing into the focusing coil 111, the focusing magnet 33 is not forced, and returns to the initial position under the influence of the elastic force of the first elastic piece 62.

Figure 4:
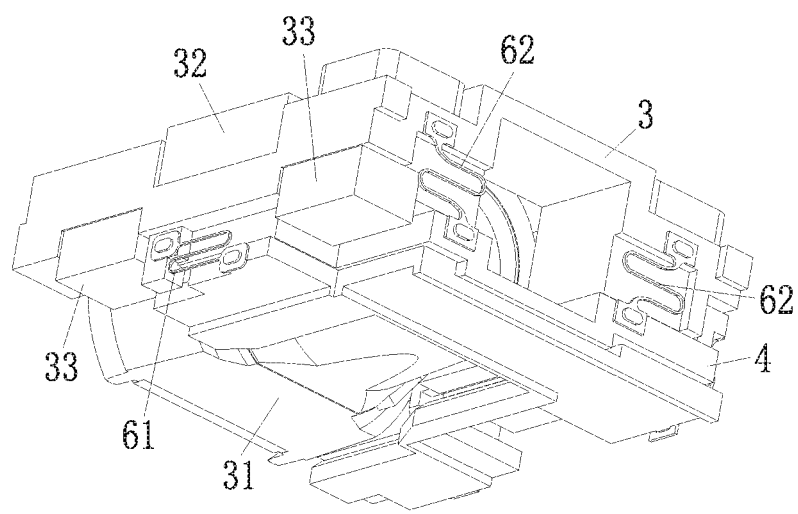
FIG. 4 is an inner partial view of the lens module of the invention.
Figure 7:
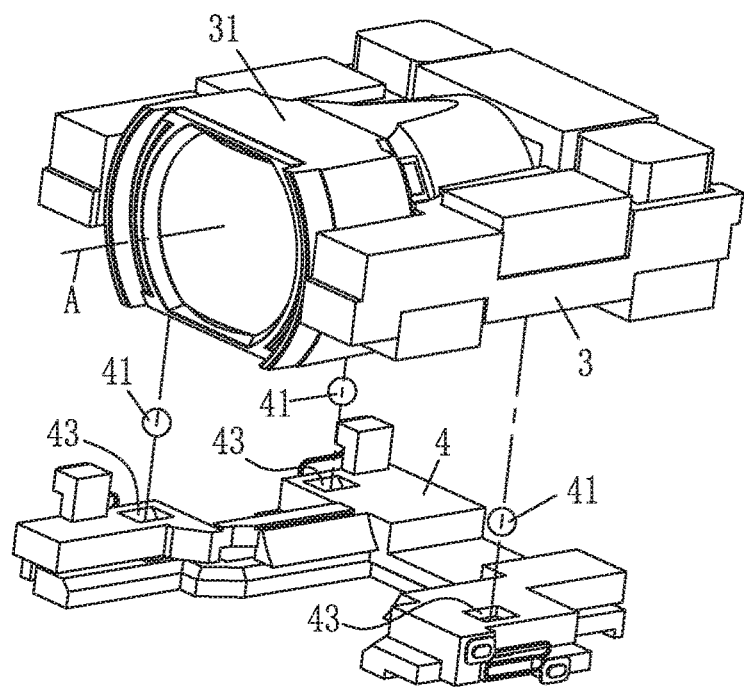
FIG. 7 is an inner partial exploded view of the lens module of the invention.

Referring to FIGS. 4, 7, and 8, the lens modulel further comprises a first ball 41, the bottom side of the focusing support frame 3 is provided with three first guide slots 34 arranged along a direction parallel to the optical axis direction. The top side of the first base 4 is provided with three second guide slots 43 arranged along a direction parallel to the optical axis. The position of the first guide slot 34 corresponds to that of the second guide slot 43. The first ball 41 is provided between the first guide slot 34 and the second guide slot 43, and each corresponding the first guide slot 34, the second guide slot 43 and the first ball 41 constitute the first guide mechanism. Both the first guide slot 34 and the second guide slot 43 extend along a direction parallel to the optical axis of the lens 31 to guide the first ball 41 to move along a direction parallel to the optical axis of the lens 31. The friction force between the focusing support frame 3 and the first base 4 is reduced by arranging the first ball 41, which makes the relative movement between the focusing support frame 3 and the first base 4 more sensitive.

Referring to FIGS. 2-3, the bottom plate 1 is a magnetic conductive piece. In this way, the bottom plate 1 forms a magnetic attraction force to the focusing support frame 3 provided with the focusing magnet 33, the first ball 41 can be compressed by the force. At the same time, the bottom plate can increase the BL value, which helps to increase the driving force.

Referring to FIGS. 4, 7, and 8, three second guide slots are provide, wherein two of the second guide slots 43 are provided on one side of the optical axis of the lens 31, the other one of the second guide slot 43 is provided separately on the other side of the optical axis of the lens 31. The second guide slot 43 provided separately is located between two second guide slots 43 provided in a pair along a direction parallel to the optical axis, and the first ball 41 is provided in each second guide slot 43. By arranging the second guide slot 43 separately provided along a direction parallel to the optical axis between two second guide slots 43 provided in pairs, three first balls 41 can form a stable three-point support structure to the focusing support frame 3, moreover, only three first balls 41 need to be arranged for forming stable support to the focusing support frame 3, which simplifies the structure and reduces the complexity of the lens module.

Referring to FIGS. 7, 8, 11, and 12, one of the first guide slot 34 has rectangle cross-section contour or one of the second guide slot 43 has rectangle cross-section contour. In this embodiment, the cross-section contour of one of the second guide slot 43 is rectangle (Referring to FIG. 12), and the rest of the cross-section contour is a trapezoid or triangle. Two opposite inclined surfaces in triangular and trapezoidal structure are both bounded to the first ball 41 for restricting the first ball 41 from moving in a direction perpendicular to the optical axis of the lens 31. By setting the cross-section contour of one of the first guide slot 34 or the cross-section contour of one of the second guide slot 43 to a rectangle, the requirement on the accuracy of part processing can be reduced.

Figure 5:
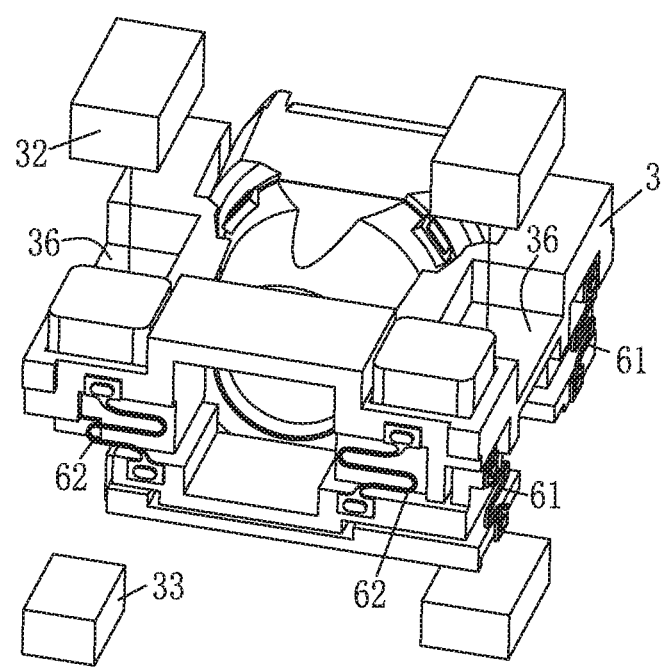
FIG. 5 is an inner partial exploded view of the lens module of the invention.
Figure 6:
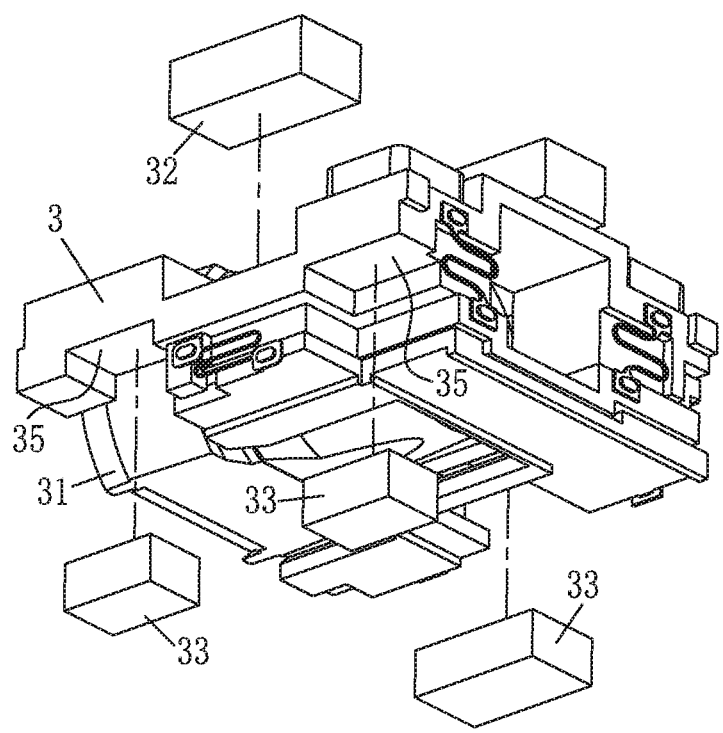
FIG. 6 is an inner partial exploded view of the lens module of the invention.

Referring to FIGS. 5-6, the focusing magnet 33 is installed on the focusing support frame 3. The focusing support frame 3 is provided with a first accommodation slot 35 on the left and right sides of lens 31 (the direction N in FIG. 3 is the right side), and the first accommodation slot 35 is provided on the bottom side of the focusing support frame 3. Three first accommodation slots 35 are provided, each of the first accommodation slot 35 is embedded with the focusing magnet 33, and three focusing coils 111 are provided and arranged respectively corresponding to three focusing magnets 33 (Refer to FIG. 3). Referring to FIG. 6, wherein two focusing magnets 33 are arranged on one side of the optical axis of the lens 31, another focusing magnet 33 is arranged on the other side of the optical axis of the lens 31. The focusing magnet 33 separately arranged is located between two focusing magnets 33 arranged in pair in a direction parallel to the optical axis. Optionally, the magnetic force received by the focusing magnet 33 arranged separately is equal to the sum of the magnetic force received by the two focusing magnets 33 provided in pair. Thus, in the process of auto focus of the lens module, the situation which can be avoided is that the magnetic force received by the focusing magnet 33 arranged separately and the sum of the magnetic force of the two focusing magnets 33 arranged in pair is not equal, which leads to the focusing support frame 3 to rotate, which leads the lens 31 to rotate, and reduces the imaging quality of lens 31.

Referring to FIG. 3, FIG. 4, FIG. 9, and FIG. 10, the lens module further comprises the second base 5, anti-shake magnet 32, anti-shake coil 211, and the second elastic piece 61. The second base 5 is located on the bottom side of the first base 4. Anti-shake magnet 32 is installed to the focusing support frame 3, the anti-shake coil 211 is installed on the top plate 1 of the housing and is used to cooperate with the anti-shake magnet 32 to drive the focusing support frame 3 to move relative to the second base 5 in a direction perpendicular to the optical axis. One end of the second elastic piece 61 is connected to the first base 4, the other end is connected to the second base 5.

Figure 9:
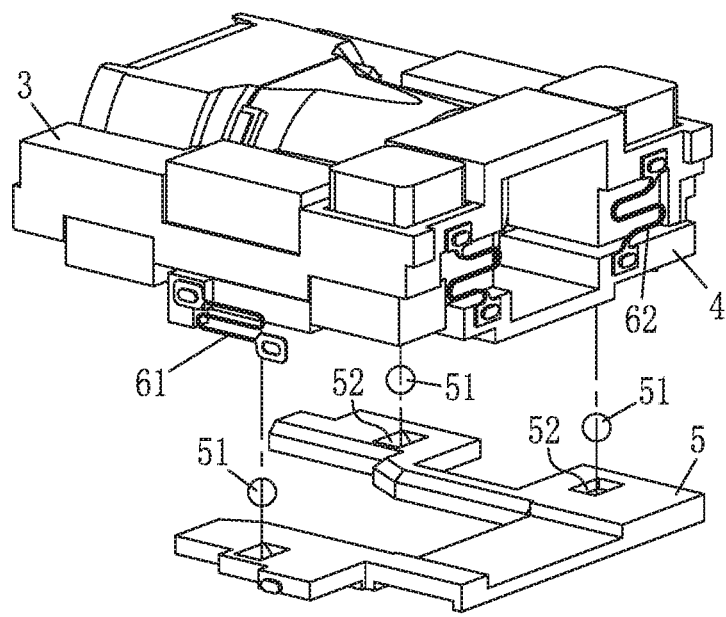
FIG. 9 is an inner partial exploded view of the lens module of the invention.
Figure 10:
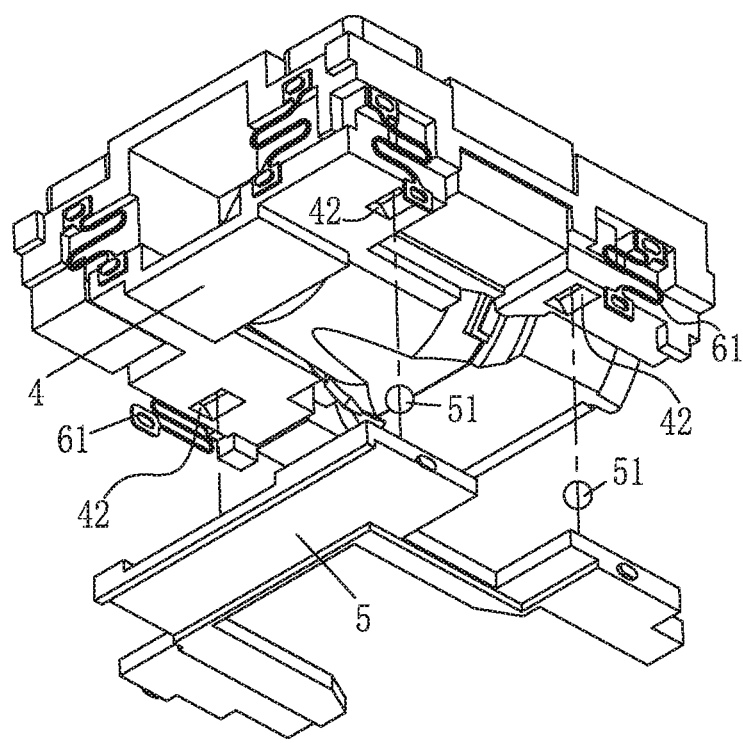
FIG. 10 is an inner partial exploded view of the lens module of the invention.
Figure 11:
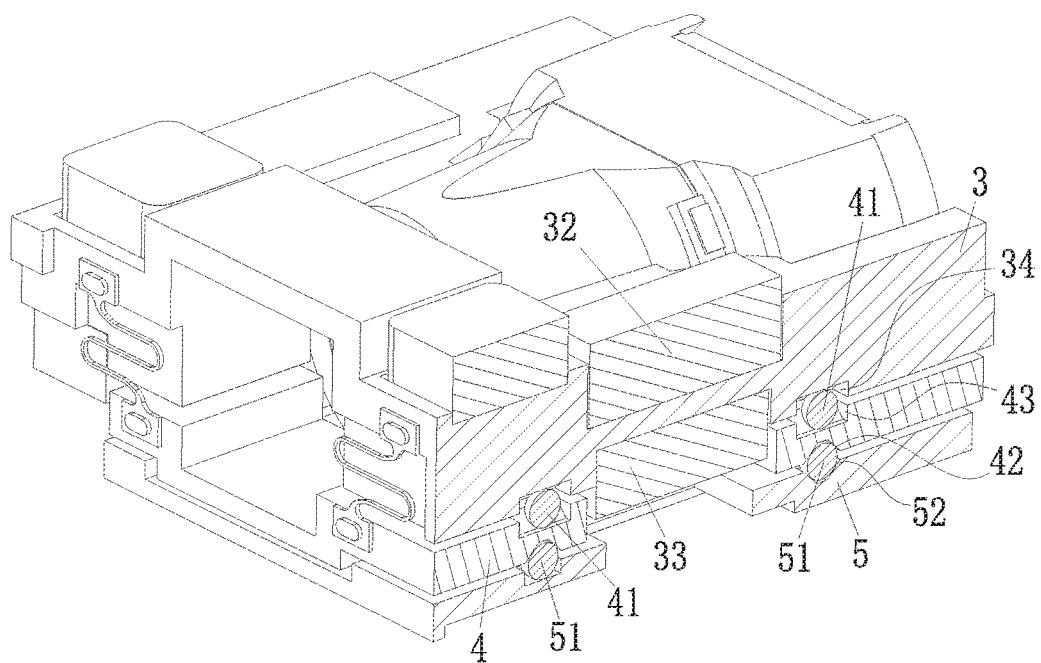
FIG. 11 is an inner partial cutaway view of the lens module of the invention.
Figure 12:
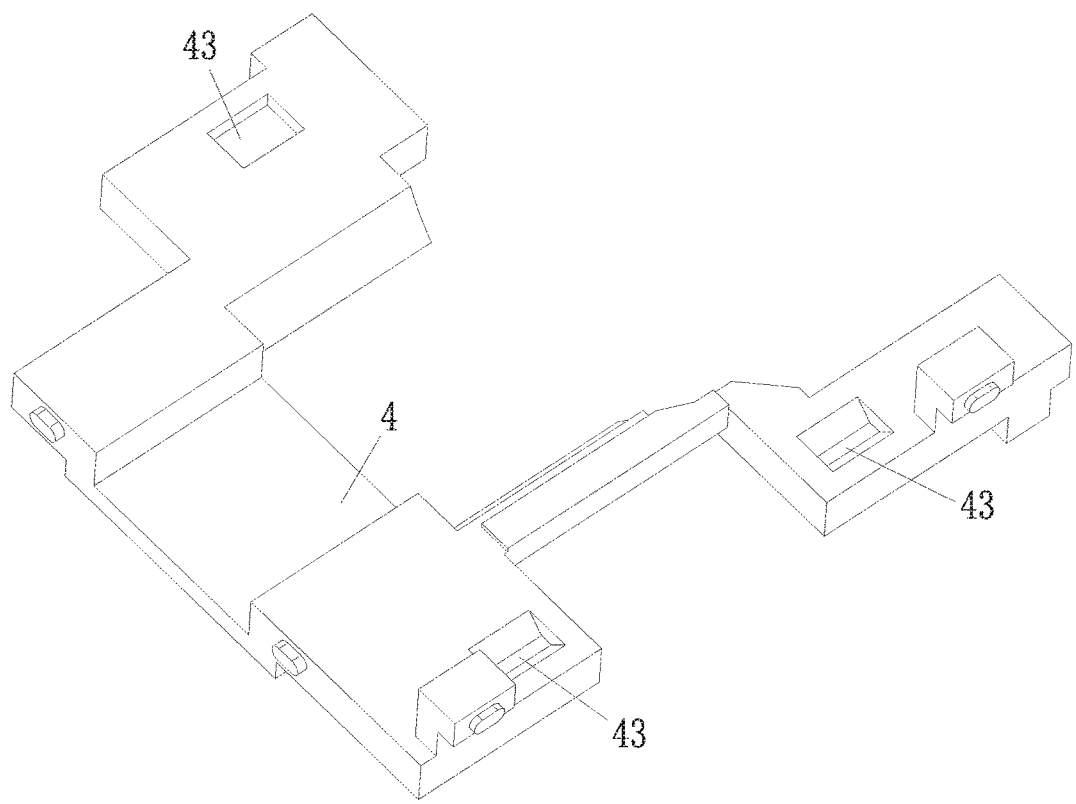
FIG. 12 is an isometric view of a first base of the lens module.
Figure 13:
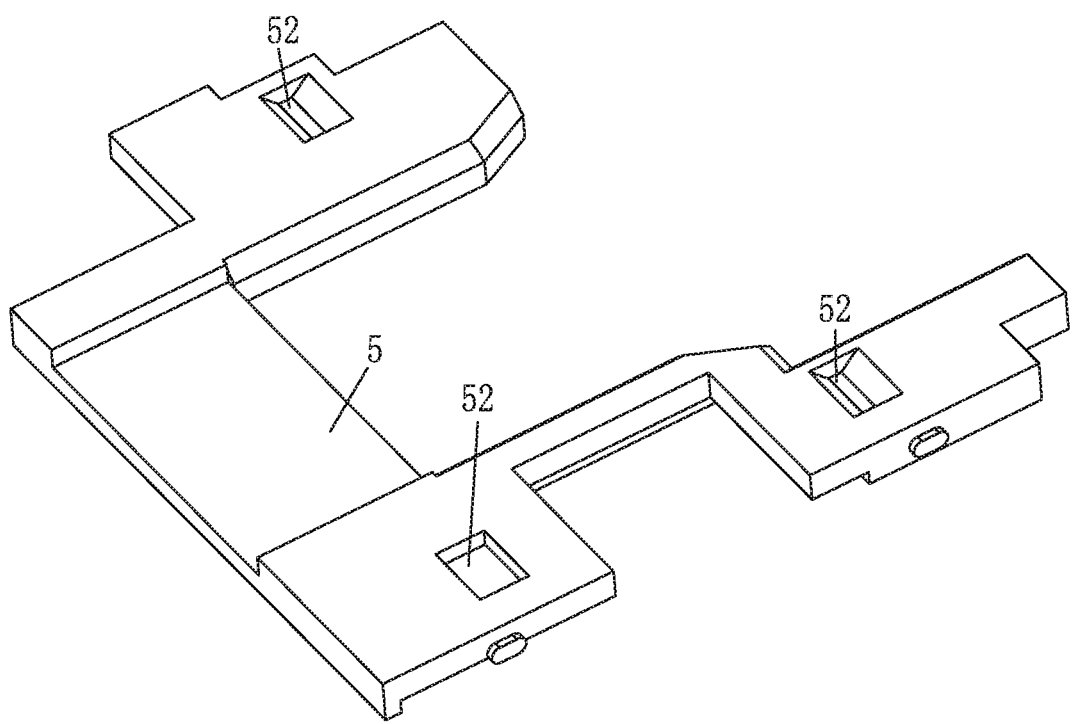
FIG. 13 is an isometric view of a second base of the lens module.

Referring to FIG. 4, FIG. 9, FIG. 10, the lens module comprises a second ball 51, the bottom side of the first base 4 is provided with three third guide slots 42 perpendicular to the optical axis direction, and the top side of the second base 5 is provided with three fourth guide slots 52 perpendicular to the optical axis direction (see FIG. 13), the position of the third guide slot 42 corresponds to the that of the fourth guide slot 52. The second ball 51 is provided between the third guide slot 42 and the fourth guide slot 52, and each corresponding the third guide slot 42, the fourth guide slot 52, and the second ball 51 constitute the second guide mechanism. The third guide slot 42 and the fourth guide slot 52 both extend in a direction perpendicular to the optical axis of lens 31 to guide the second ball 51 to move in the direction perpendicular to the optical axis direction of lens 31.

Three third guide slots 42 are provide, two of the fourth guide slots 52 are provided on one side of the optical axis of lens 31, and the other fourth guide slot 52 is provided on the other side of the optical axis of lens 31, the fourth guide slot 52 provided separately is located between two fourth guide slots 52 provided in pair in a direction parallel to the optical axis, and a second ball 51 is provided in each of the fourth guide slot 52. Referring to FIG. 9, FIG. 10, FIG. 1, FIG. 1, FIG. 3, in the third guide slot 42 and the fourth guide slot 52, the cross-section contour of one of the third guide slot 42 is a rectangle or the cross-section contour of one of the fourth guide slot 52 is a rectangle. In this embodiment, the cross-section contour of one of the fourth guide slot 52 is a rectangle (refer to FIG. 13), the remaining cross-section contours are trapezoid or triangle. In the triangle and trapezoidal structure, two opposite inclined surface are both attached to the second ball 51 to restrict the second ball 51 from moving in the direction parallel to the optical axis direction of the lens 31. The cross-section contour of one of the third guide slot 42 is set to a rectangle, or the cross-section contour of one of the fourth guide slot 52 is set to a rectangle, so as to reduce the requirement for accuracy of components processing.

As shown in FIG. 5, the anti-shake magnet 32 is installed on the focusing support frame 3, the focusing support frame 3 is provided with the second accommodation slots 36 on the left and right sides of the optical axis of the lens 31, two anti-shake magnets 32 are provided, an anti-shake magnet 32 is embedded in each of the second accommodation slot 36, and two anti-shake coils 211 are provided, are arranged corresponding to two anti-shake magnets 32 one by one (Refer to FIG. 3).

Three second elastic pieces 61 are provided, and three second elastic pieces 61 are arranged on the left and right sides of lens 31, that is, arranged on the side surface of the first base 4 parallel to the optical axis direction of the lens 31. One end of the second elastic piece 61 is connected to the first base 4 and the other end is connected to the second base 5. The second elastic piece 61 generates elastic deformation only when the focusing support frame 3 and the first base 4 are move together relative to the second base 5 along a direction perpendicular to the optical axis of the lens 31.

The working principle of the lens module is described as follows:

The focusing coil 111 is used to cooperate with the focusing magnet 33 to drive the focusing support frame 3 to move relative to the first base 4 and the second base 5 along the direction of the optical axis of the lens 31 (Refer to FIG. 4, FIG. 8, in this process, the first The elastic piece 62 is deformed, while the second elastic piece 61 is basically not deformed) to lead to auto focus of the lens 31. When the focusing coil 111 is electrically disconnected, the focusing support frame 3 is repositioned under the elastic restoring force of the first elastic piece 62.

The anti-shake coil 211 is used to cooperate with the anti-shake magnet 32 to drive the focusing support frame 3 and the first base 4 to move together relative to the second base 5 along a direction perpendicular to the optical axis (Refer to FIG. 4, FIG. 9, in this process, the second elastic piece 61 is deformed, while the first elastic piece 62 is basically not deformed), so that lens 31 achieves optical image stabilization. When the anti-shake coil 211 is electrically disconnected, the focusing support frame 3 and the first base 4 are repositioned under the elastic restoring force of the second elastic piece 61.

Referring to FIG. 2, FIG. 3, the lens module also comprises a first circuit board 21 installed on the top plate 2 and a second circuit board 11 installed on the bottom plate 1. The focusing coil 111 is electrically connected to the second circuit board 11, and the anti-shake coil 211 is electrically connected to the first circuit board 21, so that the focusing coil 111 and anti-shake coil 211 can be electrically connected, thereby generating magnetic force.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module, comprising:
    a housing;
    a focusing support frame provided with three first guide slots on a bottom side thereof;
    a first base below the focusing support frame, being provided with three second guide slots on a top side thereof, corresponding to the first guide slots;
    a second base below the first base;
    a lens accommodated in the housing and coupled to the focusing support frame;
    a first ball provided between the first guide slot and the second guide slot;
    a first guide mechanism formed by the first guide slot, the corresponding second guide slot and the first ball;
    three third guide slots provided on a bottom side of the first base;
    three fourth guide slots provided on a top side of the second base corresponding to the third guide slots;
    a second ball provided between the third guide slot and the fourth guide slot;
    a second guide mechanism formed by the third guide slot, the fourth guide slot, and the second ball; wherein
    the focusing support frame is moveable along an optical axis direction of the lens relative to the first base and the second base; and the focusing support frame and the first base is moveable together relative to the second base along a direction perpendicular to the optical axis direction,
    wherein two first guide mechanisms are provided on one side of the optical axis of the lens, and the other one of the first guide mechanism is provided separately on the other side of the optical axis of the lens; the first guide mechanism separately provided is located between other two of the first guide mechanisms along a direction parallel to the optical axis; two of the second guide mechanism are provided on one side of the optical axis of the lens, the other one of the second guide mechanisms is separately provided on the other side of the optical axis of the lens, the second guide mechanism provided separately is located between other two of the second guide mechanisms along a direction parallel to the optical axis;
    wherein the lens module comprises a plurality of focusing magnets and corresponding focusing coils arranged in pairs for driving the focusing support frame to move relative to the first base and the second base along the optical axis direction of the lens;
    and the lens module further comprises a plurality of anti-shake magnets and corresponding anti-shake coils arranged in pairs for driving the focusing support frame and the first base to move together relative to the second base along a direction perpendicular to the lens optical axis;
    the focusing magnet is fixed to the bottom side of the focusing support frame, the housing comprises a top plate and a bottom plate, the bottom plate is a magnetic conductive piece and is attracted by the focusing magnet.

2. The lens module as described in claim 1, wherein a first elastic piece is connected between the focusing support frame and the first base, the first elastic piece generates elastic deformation only when the focusing support frame moves relative to the first base and the second base along the optical axis direction of the lens; a second elastic piece is connected between the first base and the second base, the second elastic piece generates elastic deformation only when the focusing support frame and the first base move together relative to the second base along a direction perpendicular to the lens optical axis.

3. The lens module as described in claim 2, wherein the first elastic piece is arranged on side surface of the first base in a direction perpendicular to the optical axis of the lens, and the second elastic piece is arranged on side surface of the first base in a direction parallel to the optical axis of the lens.

4. The lens module as described in claim 1, wherein the first guide slot and the second guide slot both extend along a direction parallel to the optical axis for guiding the first ball to move along a direction parallel to the optical axis; the third guide slot and the fourth guide slot both extend along a direction perpendicular to the optical axis of the lens for guiding the second ball to move along a direction perpendicular to the optical axis of the lens.

5. The lens module as described in claim 1, wherein one of the first guide slots has a rectangular cross-section contour perpendicular to the optical axis direction of the lens or one of the second guide slots has a rectangular cross-section contour in a direction perpendicular to the optical axis of the lens;
    the rest cross-section contours of the first guide slot and the second guide slot are trapezoid or triangle along a direction perpendicular to the optical axis of the lens for restricting the first ball from moving along a direction perpendicular to the optical axis.

6. The lens module as described in claim 1, wherein one of the third guide slots has a rectangular cross-section contour in a direction parallel to the optical axis of the lens or one of the fourth guide slots has a rectangular cross-section contour in a direction parallel to the optical axis of the lens; the rest cross-section contours of the third guide slot and the fourth guide slot are trapezoid or triangle along a direction parallel to the optical axis of the lens for restricting the second ball from moving along a direction parallel to the optical axis.

7. The lens module as described in claim 1, wherein the focusing coil is provided on the bottom plate, and one of the anti-shake magnet and the anti-shake coil is fixed to the top side of the focusing support frame, and the other is provided on the top plate.

8. The lens module as described in claim 7, wherein a quantity of the focusing magnets is three, and two of the focusing magnets are provided on both sides of separately arranged second guide slot of the first guide mechanism in the optical axis direction; the other one of the focusing magnet is arranged between two of the second guide slots of the first guide mechanism; a quantity of the anti-shake magnets is two, and two of the anti-shake magnets are respectively arranged on both sides of the optical axis of the lens.

9. The lens module as described in claim 8, wherein the bottom side of the focusing support frame is provided with first accommodation slots, one of the focusing magnets is embedded in each of the first accommodation slots, and the second accommodation slots are provided on the top side of the focusing support frame, and one of the anti-shake magnets is embedded in each of the second accommodation slots.

\* \* \* \* \*